US007586656B2

(12) United States Patent
Gasczyk

(10) Patent No.: US 7,586,656 B2
(45) Date of Patent: Sep. 8, 2009

(54) PROCESS FOR PRODUCING OPTIMISED PRINTING FORMS

(75) Inventor: Carsten Gasczyk, Hannoversch Muenden (DE)

(73) Assignee: E. I. Du Pont De Nemours and Company, Wilmington, DE (US)

( * ) Notice: Subject to any disclaimer, the term of this patent is extended or adjusted under 35 U.S.C. 154(b) by 524 days.

(21) Appl. No.: 11/447,712

(22) Filed: Jun. 6, 2006

(65) Prior Publication Data

US 2007/0279688 A1 Dec. 6, 2007

(51) Int. Cl.
*H04N 1/46* (2006.01)

(52) U.S. Cl. ........................ 358/504; 358/518; 358/3.29

(58) Field of Classification Search ................. 358/518, 358/504, 3.29
See application file for complete search history.

(56) References Cited

U.S. PATENT DOCUMENTS

2003/0136288 A1 7/2003 Guenter et al.

FOREIGN PATENT DOCUMENTS

| | | | |
|---|---|---|---|
| EP | 0 556 133 | A | 8/1993 |
| EP | 1 365 576 | A | 11/2003 |
| JP | 2005 349788 | A | 12/2005 |
| WO | WO 2006/046249 | A | 5/2006 |

*Primary Examiner*—King Y Poon
*Assistant Examiner*—William C Storey
(74) *Attorney, Agent, or Firm*—Thomas H. Magee

(57) ABSTRACT

The invention is a process for producing an optimised printing form comprising printing onto a substrate with a printing form with predetermined raster percentages on the printing press to obtain a test print in form of a stepped wedge with raster patches, measuring the reflectance spectrum of each raster patch, determining associated colorimetric values L*,a*,b* from the reflectance spectrum, transforming the colorimetric values L*,a*,b* for each raster patch in linear correlation with the color perception of the human eye, using the formula $$RCD = \sqrt{\frac{(L^*rasterpatch - L^*substrate)^2 + (a^*rasterpatch - a^*substrate)^2 + (b^*rasterpatch - b^*substrate)^2}{(L^*solidshade - L^*substrate)^2 + (a^*solidshade - a^*substrate)^2 + (b^*solidshade - b^*substrate)^2}} \cdot 100[\%]$$

wherein RCD is the relative colorimetric difference expressed as a percentage and represents an actual raster percentage achieved on the printing press, determining dot gain for each raster patch, correcting the predetermined raster percentages of the printing form by the determined dot gain, and producing an optimised printing form using the corrected raster percentages.

7 Claims, 4 Drawing Sheets

PROCESS FOR PRODUCING OPTIMISED PRINTING FORMS

FIELD OF THE INVENTION

The invention pertains to a process for producing optimised printing forms for universal use in printing presses, particularly for use in flexographic printing.

DESCRIPTION OF RELATED ART

When producing printed matter, for example printed paper and corrugated board materials, films or similar printed matter, it is necessary, especially for standard printed products, to achieve reproducibly good print quality, in particular when the printing operation is performed on different printing presses. However, it is known that, when a print image is produced on a print medium, a print result may be obtained which, on the basis of its perceived colour, is no longer identical with the specified print original. Additionally, print results may be obtained, starting from the same print original, which also differ with regard to their perceived colour from printing press to printing press. Each printing press exhibits individual reproduction characteristics which ultimately result in an individual print result specific to the press.

It is already known at least to minimise the influence of the individual printing press on the perceived colour of the print result by producing appropriate test prints on a printing press and subsequently modifying the original printing forms by taking account of the test print result. It is known, for example, to measure the raster patches of the test print by means of a densitometer (this involves detecting the difference between incident and emitted light) and using the Murray-Davies formula to convert the values measured in this manner into percentage dot areas (to DIN ISO 12647-3).

The disadvantage of this known method is the large measurement error which must always be taken into account and may readily result in misinterpretation and overcompensation. The perceived colour of the print result may accordingly still deviate greatly from the expected printed image. Moreover, because a densitometer which operates with four colour filters is used as the measuring instrument, this method is limited to printing systems using the four basic colours of printing ink as only those colours which correspond to the inserted colour filters can be measured correctly. Correct measurement of special inks is not possible.

Accordingly, a need still exists in the printing industry for processes for producing optimised printing forms which make it possible to a great extent to eliminate the influence of the individual reproduction characteristics of a printing press and reproducibly to obtain print results of the desired quality. This should be possible not only for standard printing inks, but also for special inks.

SUMMARY OF THE INVENTION

The invention is a process for producing an optimised printing form for universal use on any desired printing press, so as to eliminate the influence of individual reproduction characteristics of the printing press, the process comprising the following steps:

A) providing a printing form with a defined print image having specified raster percentages and containing at least one stepped wedge comprising a raster patch at 0%, a raster patch at 100%, and at least one other raster patch at a predetermined percentage;

B) printing onto a substrate with the printing form provided from step A) with a printing ink on the printing press to obtain a test print of the at least one stepped wedge, where the raster patch at 0% corresponds to the color shade of the substrate, and the raster patch at 100% corresponds to solid shade of the printing ink;

C) measuring a reflectance spectrum using a spectrophotometer, and determining associated colorimetric values L*,a*,b* from the reflectance spectrum, for each of the raster patch at 0%, the raster patch at 100% and the at least one other raster patch of the at least one stepped wedge of the test print, D) transforming the colorimetric values L*,a*,b* for the at least one other raster patch in linear correlation with the colour perception of the human eye, using the formula $$RCD = \sqrt{\frac{(L^{*}rasterpatch - L^{*}substrate)^2 + (a^{*}rasterpatch - a^{*}substrate)^2 + (b^{*}rasterpatch - b^{*}substrate)^2}{(L^{*}solidshade - L^{*}substrate)^2 + (a^{*}solidshade - a^{*}substrate)^2 + (b^{*}solidshade - b^{*}substrate)^2}} \cdot 100[\%]$$

wherein RCD is a relative colorimetric difference expressed as a percentage and represents an actual raster percentage achieved on the printing press;

E) determining a dot gain for the at least one other raster patch based upon a difference between the predetermined percentage of the at least one other raster patch of the printing form and the RCD percentage obtained in step D);

F) correcting the predetermined raster percentage from the printing form by the dot gain from step E), thereby creating a corrected raster percentage for the at least one other raster patch;

and

G) producing a printing form with a print image using the corrected raster percentage obtained for the at least one other raster patch in step F).

RCD here means Relative Colorimetric Difference and indicates where a discrete raster percentage of a printed raster patch is located between the substrate (=0%) and the solid colour shade (=100%). RCD thus corresponds to the definition of raster percentage used in the printing industry. The raster percentage is a value which indicates the coverage of the corresponding raster patch and is also known as the percentage dot area. The colorimetric values L*,a*,b* are explained below in the description.

DETAILED DESCRIPTION OF THE PREFERRED EMBODIMENT(S)

Terminology used in the description to characterise the process according to the invention is terminology specific to the printing industry which, unless otherwise separately explained, has a well established meaning in the printing industry and is part of the general specialist knowledge of the person skilled in the art. Such terminology accordingly requires no further explanation.

It has surprisingly been found that, using the process according to the invention, it is possible to provide optimised printing forms in a practical but nevertheless very accurate manner, it being possible to use these printing forms to produce a specified desired print image faithfully and reproducibly on any desired printing press.

The process according to the invention may be used in any desired printing process conventionally used in the printing industry, for example flexographic, offset or gravure printing.

Figure 1:
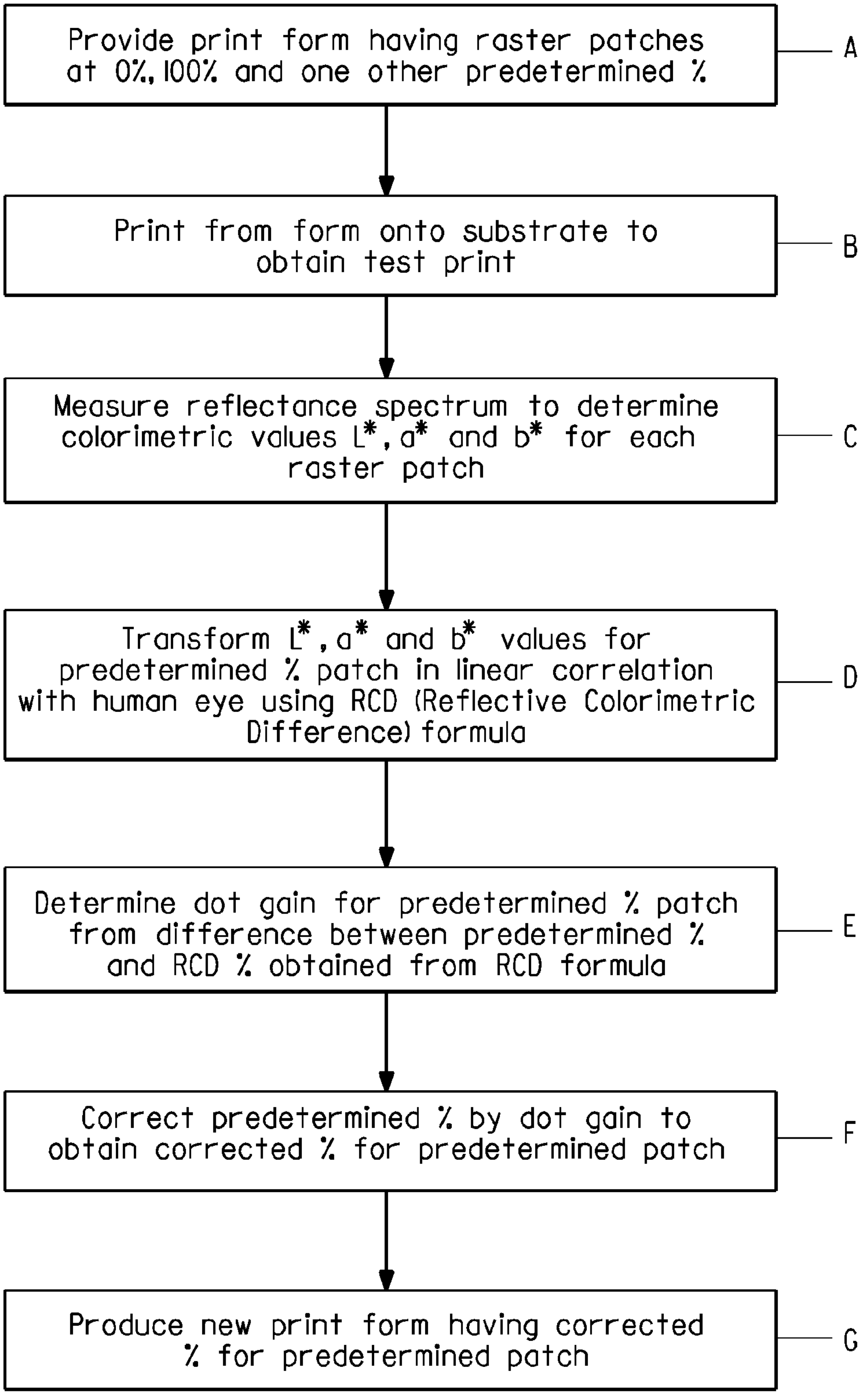
FIG. 1 is a flow chart illustrating the steps of producing an optimized printing form using the present invention.

The individual process steps of the present invention are explained in greater detail below and illustrated in FIG. 1.

In step A) of the process according to the invention, a printing form with a defined print image for the desired printing ink is first of all provided. The printing form used is a conventional printing form known to the person skilled in the art which may, for example, be in plate form or continuous form. The printing form is produced, for example, in a manner known to the person skilled in the art by producing light-transmitting and opaque areas, corresponding of the desired print image, on the printing form blank, exposing the printing form bearing the image to light and removing the unexposed areas in suitable manner. A suitable printing form is one that is used for relief printing, particularly flexographic printing. The print design is produced in conventional manner by means of a graphics software package using specified raster percentages.

The printing form must contain at least one stepped wedge including a raster patch at 0% and a raster patch at 100% as references, the 0% value corresponding to the substrate (=print medium) and the 100% value to the solid colour shade (full tone) of the particular printing ink. In addition, it contains at least one other raster patch at a predetermined percentage. Any desired raster percentages which are to be checked on a test print, for example the 90, 80, 70, 60, 50, 40, 30, 20, 10, 5, 4, 3, 2, 1% values, may be specified. Depending on requirements or the graphics software package, however, it is possible to use further specific percentages or a selection of the stated % values. If, for example, a specific raster percentage is to be obtained, it may also be included.

The equipment used for producing the printing form, for example the laser for image transfer in the production of digital printing forms, should advantageously be in a linearised, but uncalibrated state. Recalibration is substantially easier as a result. For the same reason, the printing form should preferably be produced from a linear data set.

Printing forms produced by both analogue and digital methods may be used in the process according to the invention, and printing forms produced by both analogue and digital methods may be optimised with the process according to the invention.

The number of printing forms to be provided is determined by the number of printing inks with which it is intended to produce the final print. There must be a printing form for each desired printing ink. Conventionally, for example in flexographic printing, the four standard printing inks, i.e. yellow, magenta, cyan and black, are used in the printing process. It is, however, also possible to use any other desired printing inks (special inks). One advantage of the process according to the invention is that it is not restricted to the standard printing inks, but that it may also be used when any desired special inks are used in the printing process.

In step B) of the process according to the invention, a test print using the printing form already provided in step A) is carried out on the printing press to be used. The test print is produced in the manner familiar to the person skilled in the art to yield a test print in the form of at least one stepped wedge. A stepped wedge comprises, in addition to the solid colour patch of the particular printing ink (100%) and the substrate colour patch (0%), at least one other raster patch, conventionally a number of raster patches, whose raster percentages have been specified and are known from the data set. A stepped wedge also always has a discrete raster width (lines/cm) and a discrete raster dot shape (for example circular, CS 19, etc.). Stepped wedges are conventionally produced for various angles. Each colour is screened in a different angle. This is necessary, because otherwise moire patterns would be generated on press due to the overlay of the screened structures. In flexographic printing, the angles 7.5°, 22.5°, 37.5°, 67.5° and 82° may be used.

The test print may advantageously be produced as described below.

A printing test is initially begun with a highly concentrated printing ink. In general, a sensible ink/diluent ratio should be ensured in order to achieve a practically usable printing ink viscosity.

Test prints should also be carried out at the "kiss" print setting (zero setting of the press which does not yet yield an acceptable result) in order to allow conclusions to be drawn as to the parallelism of the press settings.

The register of the printing press should be set as optimally as possible. The maximum register tolerance should not exceed half a screen square. In the case of a 40 line per centimetre screen, this would amount, for example, to at most 0.0125 mm.

In order not to distort the result, the substrate used should be the substrate which is subsequently to be used for the production print.

The printing press is slowly run up to production speed. The printed copies used for characterisation are not taken until production speed is reached. Taking the sample at a lower speed would not correspond to the characteristics of the printing press at production speed. At least 10 directly succeeding copies are advantageously taken in one piece.

If the substrate to be printed and/or the pre-printed substrate is subjected to any further processing, for example if it is coated or laminated or if it is a reverse print, the test print must be carried out under comparable conditions, i.e. for example, with identically treated substrates.

In general, the entire printing operation for producing the test print should be carried out "as usual" in order to ensure reproducibility under normal printing conditions.

Once the test print has been obtained in the form of at least one stepped wedge for a specific printing ink, the colorimetric values L*,a*,b* are then determined for each of the raster patch at 0%, the raster patch at 100% and the at least one other raster patch using a spectrophotometer in accordance with step C) of the process according to the invention.

The colorimetric values L*,a*,b* are colour values in the CIE L*a*b* colour space. The CIE (=Commission Internationale de l'Eclairage) is a committee which publishes recommendations and standards for colorimetry. DIN standards 6174 and DIN 5033 set out how CIE L*a*b* colour values are derived. L* denotes the lightness of a measured sample. The parameter a* (red/green value) indicates whether a sample is more red or more green. The parameter b* (yellow/blue value) indicates whether a sample is more yellow or more blue. The symbol "*" in the coordinates of the CIE-L*a*b* colour space means visually equidistant spacing.

Further abbreviations/parameters used:

AW=absolute white

P=paper white

β(λ)=combined colour stimulus

S=spectral radiance

λ=wavelength

ϕ=individual colour stimulus $\phi(\lambda)_x$=individual colour stimulus as a function of wavelength Δλ=spacing of the measured values (wavelength spacing)

X,Y,Z=CIE tristimulus values $X_i$=colour value at wavelength $\lambda_i$

L*a*b* colour values cannot be directly determined experimentally. In order to obtain these colour values, the spectral distribution of the measurement sample is thus first determined by means of a spectrophotometer, in other words the reflectance values are determined experimentally for each raster patch in the stepped wedge associated with a printing ink. To this end, the visible range of the spectrum is divided up into a specific number of sampling points (usually 40). The narrower are the strips, the more accurate is the result. Conventionally, the range of the spectrum is divided up into strips of a constant width, for example a width of 10 nanometers. Grassmann's Laws state that the red (R), green (G) and blue (B) colour values of a colour stimulus combined from two individual stimuli may be calculated by adding together the previously determined individual colour values Rx,Gx,Bx and Ry,Gy,By. Accordingly, the example's 40 reflectance values determined with the spectrophotometer may be added together and yield the combined colour stimulus:

$$\beta(\lambda) = \frac{\Phi(\lambda_{\lambda P})}{\Phi(\lambda_{\lambda AW})}$$

At a specific wavelength $\lambda_i$ in the determined spectral distribution function, it is now possible, for example, to calculate a value Xi for the X value according to the following formula:

$$X_i = \bar{x}(\lambda_i) * [S(\lambda_i) * \beta(\lambda_i) * \Delta\lambda]$$

The Y and Z values of this selected sampling point may be calculated in analogous manner. Once the X, Y and Z values for all forty sampling points have been determined, the values for the CIE tristimulus values X, Y, Z may be calculated according to the following formula:

$$X = \sum_{i=1}^{40} X_i = \sum_{i=1}^{40} \bar{x}(\lambda_i) * S(\lambda_i) * \beta(\lambda_i) * \Delta\lambda$$

-continued $$Y = \sum_{i=1}^{40} Y_i = \sum_{i=1}^{40} \bar{Y}(\lambda_i) * S(\lambda_i) * \beta(\lambda_i) * \Delta\lambda$$

$$Z = \sum_{i=1}^{40} Z_i = \sum_{i=1}^{40} \bar{Z}(\lambda_i) * S(\lambda_i) * \beta(\lambda_i) * \Delta\lambda$$

Lightness L* may be calculated as follows:

$$L^* = 116 \cdot Y^* - 16$$

The higher is the measured value for L*, the lighter is the measured sample. At a lightness of "0", the measured sample is completely black. At a lightness of "100", the measured sample is white.

The parameter a* may be calculated as follows:

$$a^* = 500 \cdot (X^* - Y^*)$$

The more highly positive the "a* value", the redder is the sample, the smaller the "a* value", the greener is the sample.

The parameter b* may be calculated as follows:

$$b^* = 200 \cdot (Y^* - Z^*)$$

The more highly positive the "b* value", the yellower is the sample, the smaller the "b* value", the bluer is the sample.

The auxiliary variables X*, Y* and Z* required for forming the variables a* and b* may vary from 0 to 1. It may be concluded from this that the theoretical values are from −200 to +200 for a* and from −500 to +500 for b*. Such values are, however, not achieved in practice. In order to calculate the X*, Y* and Z* values, which are required for calculation of the L*a*b* values, DIN ISO 13655 2000-02 stipulates as a condition that, in order to ensure that the observation conditions to ISO 3664 are matched, the colour values must be calculated on the basis of CIE illuminant D50 and of the CIE standard colorimetric system 1931 (also known as the standard 20 colorimetric observer).

As a result, the corresponding L*a*b* values, derived from the measured reflectance spectrums, for each of the raster patch at 0%, the raster patch at 100% and the at least one other raster patch each of the at least one stepped wedge for a specific printing ink are obtained in step C) of the process according to the invention.

In step D) of the process according to the invention, the resultant three-dimensional colorimetric values L*a*b* for the at least one other raster patch of the at least one stepped wedge are then transformed in a linear correlation with the colour sensitivity of the human eye, i.e., without using a reference curve, into two-dimensional raster percentages. The raster percentages for a raster patch are here determined as a relative colorimetric difference (RCD) from the L*a*b* values for the solid colour shade of the particular printing ink (solid shade), for the substrate to be printed (substrate) and for the colour shade of the corresponding raster patch (raster patch) using the following formula:

$$RCD = \sqrt{\frac{(L^*rasterpatch - L^*substrate)^2 + (a^*rasterpatch - a^*substrate)^2 + (b^*rasterpatch - b^*substrate)^2}{(L^*solidshade - L^*substrate)^2 + (a^*solidshade - a^*substrate)^2 + (b^*solidshade - b^*substrate)^2}} \cdot 100[\%]$$

Since the CIE L*a*b* colour space is an approximately equidistantly spaced colour space, the colorimetric difference between the raster patch and the substrate can be related to the colorimetric difference between the solid shade and the substrate. A percentage scale is obtained by multiplying by 100.

Since the differences in the CIE L*a*b* colour space correspond to the sensitivity of the human eye, the determined raster percentages (RCD values) may be used directly without making use of a reference function (as is for example necessary in the densitometer-based Murray-Davies formula). This simplifies the process and increases accuracy.

The RCD value thus represents the raster percentages which are actually achieved with the printing press (output values), which, when compared with the originally specified raster percentages (input values), form the basis for the correction of the latter.

In step E) of the process according to the invention, a dot gain for the at least one other raster patch is first determined based upon a difference between the predetermined percentage of the at least one other raster patch of the printing form and the RCD percentage obtained in step D);

In the printing industry, dot gain is conventionally defined as the difference between the measured raster percentage of the printed raster patch and the geometric dimensions of the raster dots in the printing form produced with reference to the specified raster percentages (dot gain=raster percentage of print minus raster percentage of printing form). Printing forms produced by digital methods conventionally include an actinic radiation opaque layer adjacent a photopolymerizable layer. The actinic radiation opaque layer is imagewise exposed with laser radiation to selectively remove the actinic radiation opaque layer and form an in-situ mask image disposed above the photopolymerizable layer. When producing printing forms by digital methods, in contrast with analogue methods, exposure and thus the crosslinking of the image-forming photopolymerizable layer, i.e., the differentiation between image areas and non-image areas, does not proceed under a vacuum. Atmospheric oxygen, being a free-radical reaction partner, may thus inhibit the polymerisation reaction. As a consequence of the inhibiting influence of atmospheric oxygen on the polymerisation reaction, the raster dots formed in the printing form are thus smaller than raster dots created in the in-situ mask image.

This means that "natural" compensation already occurs in digital printing forms due to inhibition of the polymerisation reaction by atmospheric oxygen. This compensation may be considered to be constant and may thus be disregarded. Dot gain may therefore be determined for digital printing forms as the difference between the measured raster percentage of the printed raster patch and the geometric dimensions of the raster dots in the in-situ mask image. Thus, dot gain can be defined for printing forms produced by digital methods and by analogue methods as the difference between the measured raster percentage of the printed raster patch and the raster percentage of the input data, where the input data for digital methods is the geometric dimensions of the raster dots in the in-situ mask image, and the input data for analogue methods is the geometric dimensions of the raster dots in the phototool.

In step F) of the process according to the invention, the originally specified (predetermined) raster percentages (input values) are then corrected by the dot gain determined as above.

Specifically, this means that both the specified raster percentages (input data), as were input into the graphics software and are present in the data set, and the raster percentages actually achieved with the printing press (RCD values=output values) are entered into the control program of a Raster Image Processor (RIP). On the basis of these data, the control program produces an input/output matrix containing the input values (=nominal values) and the output values determined as described above (=actual values). The matrix thus provides information about the adjustment to the input data which is necessary to achieve desired optimum printing characteristics in the subsequent print run on the corresponding printing press. The difference between the input values and output values yields the dot gain by which the originally input values must be corrected. The input values corrected in this manner may be presented in the form of a compensation curve.

In step G) of the process according to the invention, an optimised printing form is produced using the corrected raster percentage for the at least one other raster patch obtained in step F). An optimised printing form is produced for each desired printing ink.

With the assistance of this input/output matrix, the Raster Image Processor here in conventional manner converts the continuous tone data produced in the graphics software (8-bit grey values) into 1-bit raster percentages. These 1-bit data may be used to produce the optimised printing forms for the production print.

Optimised printing forms may be produced with the process according to the invention, with which print results of the desired quality may be achieved, largely irrespective of the individual reproduction characteristics of a printing press. The relative colorimetric difference (RCD) used to correct the input data is in principle congruent with the visual colour sensitivity of the human eye. No reference curve is required. In comparison with the three-dimensional colorimetric values, the linear raster percentages obtained are more readily handled or comprehensible for practical purposes.

According to this invention for the production of optimised printing forms, the influence of the individual reproduction characteristics of a printing press may largely be eliminated. Desired print originals can be converted into very good quality prints and reproducible print results may also be achieved even on different printing presses each having individual reproduction characteristics. The process according to the invention may advantageously be used both for calibrating a printing press and for quality control in ongoing printing operations on the corresponding printing press.

The following Example is intended to illustrate the invention in greater detail.

EXAMPLE

Figure 2:
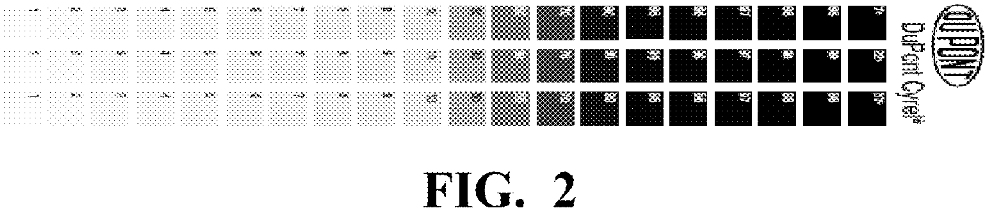
FIG. 2 is a diagrammatic illustration showing a digital linear file of stepped wedges produced at 3 different angles (7°, 22° and 37°).

Using image processing software, the digital linear file of stepped wedges shown in FIG. 2 was produced at 3 different angles (7, 22 and 37°).

Figure 3:
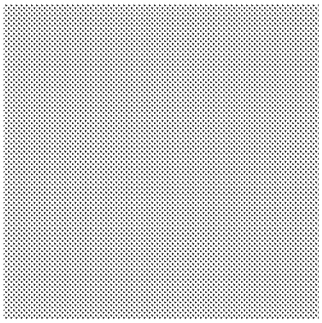
FIG. 3 is a diagrammatic illustration showing a 30% grey raster patch of the first stepped wedge (at 7°) shown in FIG. 2.

The process according to the invention is illustrated by way of example with reference to the 30% raster patch of the first stepped wedge (at 7°) shown in FIG. 3).

Figure 4:
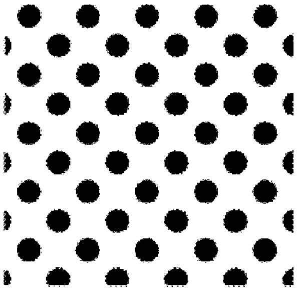
FIG. 4 is a diagrammatic illustration showing a 30% screened file converted from the grey raster patch shown in FIG. 3.

The file was then converted by the Raster Image Processor (RIP) from continuous tone data (grey shades) into raster percentages. This operation proceeded linearly in the middle shade. The recorder zones were transferred such that the minimum raster percentage was printed out stably (cleanly and uniformly) (shown in FIG. 4).

Figure 5:
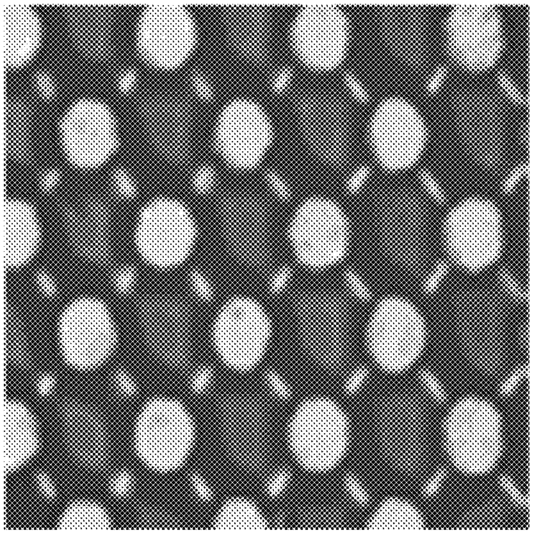
FIG. 5 is a photographic reproduction showing a plan view of a printing form surface having a 30% screened raster patch.
Figure 6:
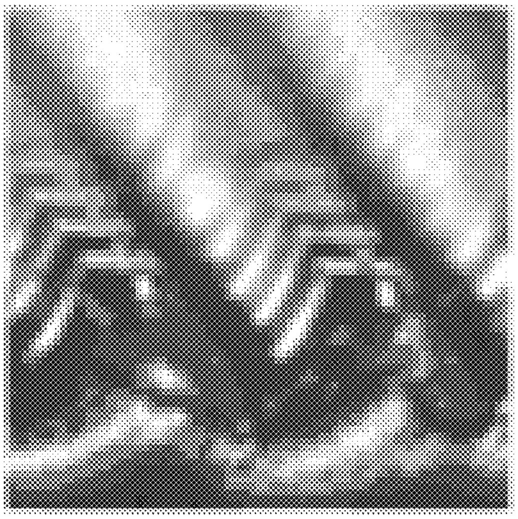
FIG. 6 is a photographic reproduction showing a side view of a printing form surface having a 30% screened raster patch.

A printing form was then produced in a conventional manner and included an image having at least 30% screened raster patch. The views in FIG. 5 and FIG. 6 represent surfaces of the produced printing form. The printing form was then used to create a test print of a designated printing ink on a printing press.

Once a test print had been pulled from the printing form on a printing press, a "fingerprint" (the distinctive reproduction characteristics of the printing form used in combination with the printing press used, the printing ink used and the substrate used) was obtained in the form of a stepped wedge (similar to that shown in FIG. 2.

The raster patches of the stepped wedge were then analysed by means of a spectrophotometer. The following Table shows the reflection values for the 30% raster percentage, for the substrate (paper white) and for the solid shade black (recorded in 10 nm steps).

| | 380 nm | 390 nm | 400 nm | 410 nm | 420 nm | 430 nm | 440 nm | 450 nm | 460 nm | 470 nm |
|---|---|---|---|---|---|---|---|---|---|---|
| Paper white | 0.54777 | 0.56073 | 0.54660 | 0.53135 | 0.50324 | 0.48304 | 0.47754 | 0.45967 | 0.49032 | 0.56156 |
| 30% black | 0.25208 | 0.26135 | 0.26527 | 0.27026 | 0.27391 | 0.27897 | 0.28403 | 0.28813 | 0.29140 | 0.29307 |
| Solid shade | 0.01891 | 0.02172 | 0.02315 | 0.02394 | 0.02479 | 0.02576 | 0.02605 | 0.02637 | 0.02646 | 0.02651 |

| | 480 nm | 490 nm | 500 nm | 510 nm | 520 nm | 530 nm | 540 nm | 550 nm | 560 nm | 570 nm |
|---|---|---|---|---|---|---|---|---|---|---|
| Paper white | 0.60085 | 0.61127 | 0.61206 | 0.60489 | 0.59759 | 0.60003 | 0.60730 | 0.60576 | 0.60140 | 0.61600 |
| 30% black | 0.29490 | 0.29732 | 0.29945 | 0.30083 | 0.30265 | 0.30367 | 0.30478 | 0.30567 | 0.30497 | 0.30636 |
| Solid shade | 0.02672 | 0.02683 | 0.02677 | 0.02691 | 0.02722 | 0.02726 | 0.02747 | 0.02776 | 0.02749 | 0.02713 |

| | 580 nm | 590 nm | 600 nm | 610 nm | 620 nm | 630 nm | 640 nm | 650 nm | 660 nm | 670 nm |
|---|---|---|---|---|---|---|---|---|---|---|
| Paper white | 0.63698 | 0.65297 | 0.66130 | 0.66567 | 0.66536 | 0.66194 | 0.66553 | 0.68057 | 0.70797 | 0.73828 |
| 30% black | 0.30810 | 0.31280 | 0.31603 | 0.31694 | 0.31688 | 0.31581 | 0.31560 | 0.31548 | 0.31499 | 0.31378 |
| Solid shade | 0.02727 | 0.02810 | 0.02868 | 0.02864 | 0.02873 | 0.02868 | 0.02859 | 0.02856 | 0.02873 | 0.02872 |

| | 680 nm | 690 nm | 700 nm | 710 nm | 720 nm | 730 nm |
|---|---|---|---|---|---|---|
| Paper white | 0.76268 | 0.77955 | 0.79106 | 0.79927 | 0.80229 | 0.80664 |
| 30% black | 0.31293 | 0.31169 | 0.31059 | 0.30999 | 0.30805 | 0.30688 |
| Solid shade | 0.02844 | 0.02842 | 0.02851 | 0.02869 | 0.02852 | 0.02872 |

Using the formulae stated in the description, the parameters shown in the following Table 1 were then determined from the reflection values. The determined values assume 5000 K illumination and a standard 2° observer as the basis for calculation.

TABLE 1

| | X | Y | Z | x | y | L* | a* | b* |
|---|---|---|---|---|---|---|---|---|
| Paper white | 0.6174 | 0.6319 | 0.4265 | 0.3684 | 0.3771 | 83.54 | 1.95 | 11.04 |
| 30 percent black | 0.2985 | 0.3088 | 0.2383 | 0.3530 | 0.3652 | 62.41 | 0.31 | 2.92 |
| Solid shade black | 0.0270 | 0.0279 | 0.0217 | 0.3532 | 0.3638 | 19.16 | 0.35 | 1.15 |

On the basis of the L*a*b* values of the three raster patches (paper white=substrate; solid shade=solid shade black; 30% value), the actual output raster percentage was then calculated using the formula for relative colorimetric difference (RCD value).

An output raster percentage of 34.8% coverage was obtained.

An input raster percentage of 30% has thus grown due to mechanical deformation in the press to an output raster percentage of 34.8%.

The resultant dot gain thus amounts to 4.8% (output raster percentage of 34.8% minus input raster percentage of 30%).

Figure 7:
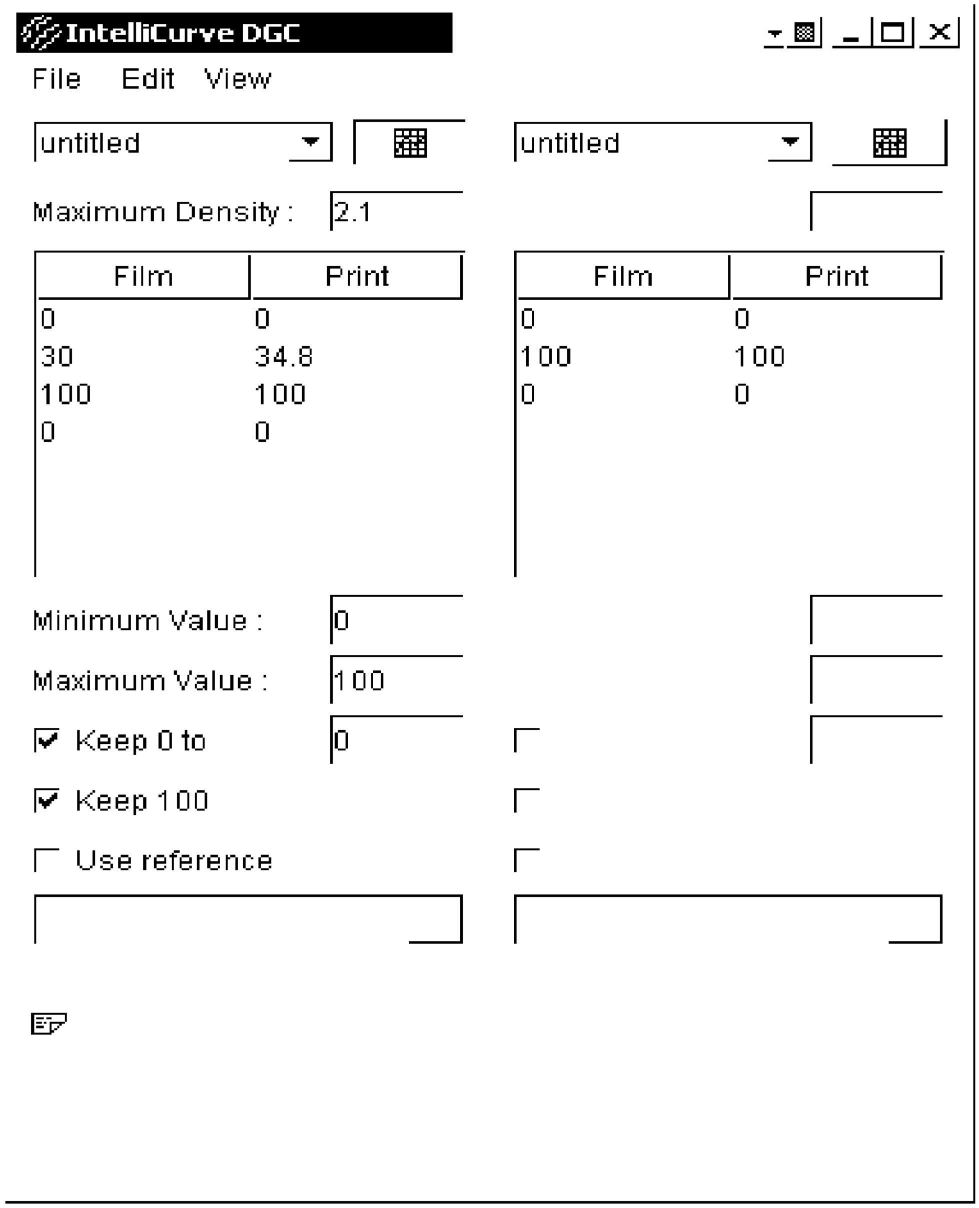
FIG. 7 is a screenshot from the calibration software of an ESKO Graphics RIP.

The values were then input into the calibration software of an ESKO Graphics RIP (as shown in the screenshot in FIG. 7).

The printing form produced with the corrected input values exhibited an output value of 30% in the print, which matched the originally specified input value of 30%. The print result corresponded to the expected printed image.

What is claimed is:

1. A process for producing a printing form for use on a printing press, comprising the following steps:

A) providing a printing form with a defined print image having specified raster percentages and containing at least one stepped wedge comprising a raster patch at 0%, a raster patch at 100%, and at least one other raster patch at a predetermined percentage;

B) printing onto a substrate with the printing form provided from step A) with a printing ink on the printing press to obtain a test print of the at least one stepped wedge, where the raster patch at 0% corresponds to the color shade of the substrate, and the raster patch at 100% corresponds to solid shade of the printing ink;

C) measuring a reflectance spectrum using a spectrophotometer, and determining associated colorimetric values L*,a*,b* from the reflectance spectrum, for each of the raster patch at 0%, the raster patch at 100% and the at least one other raster patch of the at least one stepped wedge of the test print, D) transforming the colorimetric values L*,a*,b* for the at least one other raster patch in linear correlation with the colour perception of the human eye, using the formula $$RCD = \sqrt{\frac{(L^*rasterpatch - L^*substrate)^2 + (a^*rasterpatch - a^*substrate)^2 + (b^*rasterpatch - b^*substrate)^2}{(L^*solidshade - L^*substrate)^2 + (a^*solidshade - a^*substrate)^2 + (b^*solidshade - b^*substrate)^2}} \cdot 100[\%]$$

wherein RCD is a relative colorimetric difference expressed as a percentage, and represents an actual raster percentage achieved on the printing press, E) determining a dot gain for the at least one other raster patch based upon a difference between the predetermined percentage of the at least one other raster patch of the plate and the RCD percentage obtained in step D);

F) correcting the predetermined raster percentage from the printing form by the dot gain from step E), thereby creating a corrected raster percentage for the at least one other raster patch;

and

G) producing a printing form with a print image using the corrected raster percentage obtained for the at least one other raster patch in step F).

2. The process according to claim 1, wherein a printing form is produced for each desired printing ink for the print image.

3. The process according to claim 1 for producing digital printing forms.

4. The process according to claim 1 for producing printing forms in plate form or continuous form.

5. The process according to claim 1 for producing printing forms for flexographic, offset or gravure printing.

6. The process according to claim 1 used for calibration of printing press.

7. The process according to claim 1 used for quality control of printed matter printed on the printing press.

* * * * *

UNITED STATES PATENT AND TRADEMARK OFFICE

CERTIFICATE OF CORRECTION

PATENT NO. : 7,586,656 B2
APPLICATION NO. : 11/447712
DATED : September 8, 2009
INVENTOR(S) : Carsten Gasczyk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Twenty-first Day of September, 2010

David J. Kappos

*Director of the United States Patent and Trademark Office*